US012713144B2

(12) United States Patent
Ollila

(10) Patent No.: US 12,713,144 B2
(45) Date of Patent: Aug. 18, 2026

(54) ALTERNATE SUBSAMPLING IN COLOUR FILTER ARRAYS

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 221 days.

(21) Appl. No.: 18/533,435

(22) Filed: Dec. 8, 2023

(65) Prior Publication Data

US 2025/0193543 A1 Jun. 12, 2025

(51) Int. Cl.

*H04N 25/13* (2023.01)
*H04N 23/62* (2023.01)
*H04N 25/11* (2023.01)
*H04N 25/445* (2023.01)
*H04N 25/78* (2023.01)

(52) U.S. Cl.

CPC ........... *H04N 25/134* (2023.01); *H04N 23/62* (2023.01); *H04N 25/445* (2023.01); *H04N 25/78* (2023.01); *H04N 25/11* (2023.01)

(58) Field of Classification Search

CPC .... H04N 25/445; H04N 25/134; H04N 25/78; H04N 25/11; H04N 23/62

See application file for complete search history.

(56) References Cited

U.S. PATENT DOCUMENTS

2023/0254600 A1* 8/2023 Aoki ...................... G02B 5/208 348/222.1
2024/0007771 A1* 1/2024 Berkovich .............. G06F 3/013

* cited by examiner

*Primary Examiner* — Nicholas G Giles

(74) *Attorney, Agent, or Firm* — Ziegler IP Law Group, LLC.

(57) ABSTRACT

Image data from an image sensor is read out, wherein when reading out, processor(s) is/are configured to employ subsampling by: reading out the image data from photo-sensitive cells that correspond to a first set of lines in a colour filter array (CFA), wherein a given line in the first set has colour filters of each of at least three different colours, the given line being a row (R1-R8) or a column (C1-C8) of the CFA; and skipping read out from photo-sensitive cells that correspond to a second set of lines in the CFA, wherein the first set of lines has one of: odd lines in the CFA, even lines in the CFA, while the second set of lines has another of: the odd lines, the even lines. The image data is processed to generate an image.

6 Claims, 6 Drawing Sheets

ALTERNATE SUBSAMPLING IN COLOUR FILTER ARRAYS

TECHNICAL FIELD

The present disclosure relates to imaging systems incorporating alternate subsampling in colour filter arrays (CFAs). The present disclosure also relates to methods incorporating alternate subsampling in CFAs.

BACKGROUND

Nowadays, with an increase in the number of images being captured every day, there is an increased demand for developments in image processing. Such a demand is quite high and critical in case of evolving technologies such as immersive extended-reality (XR) technologies which are being employed in various fields such as entertainment, real estate, training, medical imaging operations, simulators, navigation, and the like. Several advancements are being made to develop image generation technology.

However, existing image generation technology has several limitations associated therewith. Firstly, the existing image generation technology processes image signals captured by pixels of an image sensor of a camera in a manner that such processing requires considerable processing resources, involves a long processing time, requires high computing power, and limits a total number of pixels that can be arranged on an image sensor for full pixel readout at a given frame rate. As an example, image signals corresponding to only about 9 million pixels on the image sensor may be processed currently (by full pixel readout) to generate image frames at 90 frames per second (FPS). Moreover, even when subsampling is to be employed when reading out image data from the image sensor, it results in a significant gap of unread/missing image data, because the subsampling is performed by reading out two lines and skipping next two lines in alternating manner due to a typical structure of a Bayer colour filter array. Thus, greater amount of image data needs to be interpolated using very limited amount of known image data, which subsequently results in poorer image quality.

Secondly, existing equipment and techniques for image generation are inefficient in terms of generating images that have an acceptably high visual quality (for example, in terms of high resolution) throughout a wide field of view. This is because processing of image signals captured by pixels of an image sensor requires considerable processing resources, involves a long processing time, requires high computing power, and limits a total number of pixels that can be arranged on an image sensor for full pixel readout at a given frame rate. As an example, image signals corresponding to only about 10 million pixels on the image sensor may be processed currently (by full pixel readout) to generate image frames at 90 frames per second (FPS). Therefore, the existing equipment and techniques are not well-suited for generating such high visual quality images along with fulfilling other requirements in XR devices, for example, such as a high resolution (such as a resolution higher than or equal to 60 pixels per degree), a small pixel size, a large field of view, and a high frame rate (such as a frame rate higher than or equal to 90 FPS).

Therefore, in light of the foregoing discussion, there exists a need to overcome the aforementioned drawbacks.

SUMMARY

The present disclosure seeks to provide an imaging system and a method to generate high-quality, realistic images at a high framerate, by way of processing image data that is read out by employing subsampling. The aim of the present disclosure is achieved by imaging systems and methods which incorporate alternate subsampling in colour filter arrays, as defined in the appended independent claims to which reference is made to. Advantageous features are set out in the appended dependent claims.

Throughout the description and claims of this specification, the words “comprise”, “include”, “have”, and “contain” and variations of these words, for example “comprising” and “comprises”, mean “including but not limited to”, and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
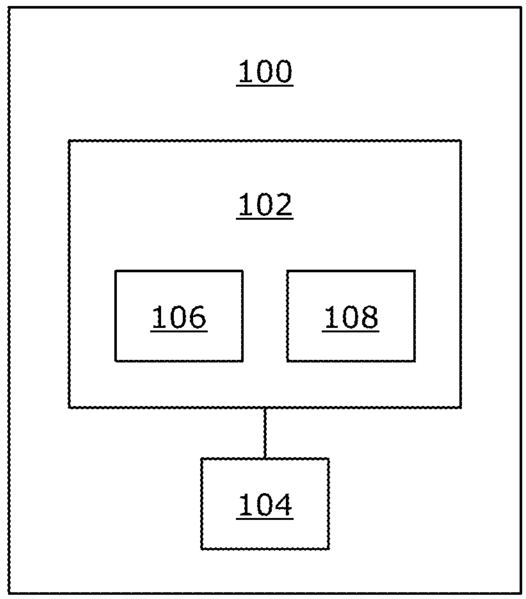
FIG. 1 illustrates a block diagram of an architecture of an imaging system incorporating alternate subsampling in colour filter arrays, in accordance with a first aspect and a third aspect of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:

- an image sensor comprising:
  - a plurality of photo-sensitive cells arranged on a photo-sensitive surface of the image sensor; and
  - a colour filter array comprising colour filters of at least three different colours; and
- at least one processor configured to:
  - read out image data from the image sensor, wherein when reading out, the at least one processor is configured to employ subsampling in at least a region of the photo-sensitive surface, by:

reading out the image data from those photo-sensitive cells that correspond to a first set of lines in the colour filter array, wherein a given line in the first set comprises colour filters of each of the at least three different colours, the given line being a row or a column of the colour filter array; and skipping read out from those photo-sensitive cells that correspond to a second set of lines in the colour filter array, wherein the first set of lines comprises one of: odd lines in the colour filter array, even lines in the colour filter array, while the second set of lines comprises another of: the odd lines, the even lines; and process the image data to generate an image.

In a second aspect, an embodiment of the present disclosure provides a method comprising:

reading out image data from an image sensor, wherein the image sensor comprises a plurality of photo-sensitive cells arranged on a photo-sensitive surface of the image sensor, and a colour filter array comprising colour filters of at least three different colours, and wherein the step of reading out comprises employing subsampling in at least a region of the photo-sensitive surface, by:

reading out the image data from those photo-sensitive cells that correspond to a first set of lines in the colour filter array, wherein a given line in the first set comprises colour filters of each of the at least three different colours, the given line being a row or a column of the colour filter array; and skipping read out from those photo-sensitive cells that correspond to a second set of lines in the colour filter array, wherein the first set of lines comprises one of: odd lines in the colour filter array, even lines in the colour filter array, while the second set of lines comprises another of: the odd lines, the even lines; and processing the image data to generate an image.

The present disclosure provides the aforementioned imaging system and the aforementioned method incorporating alternate subsampling in colour filter arrays, to generate high-quality, realistic images at a high framerate, by way of processing image data that is read out by employing subsampling, in computationally-efficient and time-efficient manner. Herein, when the subsampling is performed, a processing time for selectively reading out the image data from at least the region of the photo-sensitive surface is considerably lesser, as compared to a processing time for reading out the image data from each and every photo-sensitive cell in at least said region. In addition to this, reading out (and processing) the image data from those photo-sensitive cells that correspond to the first set of lines in the CFA, enables in achieving a high visual quality (for example, in terms of a native resolution, a high contrast, a realistic and accurate colour reproduction, and the like) in corresponding pixels of the image (that is generated upon processing the image data). This is because the colour filters of the at least three different colours (in the lines of the first set) facilitates in providing better colour reproduction and resolution in the corresponding pixels of the image. The CFA having the first set of lines and the second set of lines facilitates in providing improved image quality, as compared to employing a standard CFA (for example, such as a Bayer CFA) for subsampling purposes. Furthermore, a selective read out of the image data facilitates in providing a high frame rate of images, whilst reducing computational burden, delays, and excessive power consumption. The imaging system and the method are susceptible to cope with visual quality requirements, for example, such as a high resolution (such as a resolution higher than or equal to 60 pixels per degree), a small pixel size, and a large field of view, whilst achieving a high (and controlled) frame rate (such as a frame rate higher than or equal to 90 FPS). The imaging system and the method are simple, robust, fast, reliable, support real-time alternate subsampling in CFAs, and can be implemented with ease.

There will now be provided details of various operations as described earlier with respect to the aforementioned first aspect.

Throughout the present disclosure, the term "image sensor" refers to a device that detects light from a real-world environment at the plurality of photo-sensitive cells (namely, a plurality of pixels) to capture a plurality of image signals. The plurality of image signals are electrical signals pertaining to a real-world scene of the real-world environment. The plurality of image signals constitute the image data of the plurality of photo-sensitive cells. Examples of the image sensor include, but are not limited to, a charge-coupled device (CCD) image sensor, and a complementary metal-oxide-semiconductor (CMOS) image sensor. Image sensors are well-known in the art.

Throughout the present disclosure, the term "image data" refers to information pertaining to a given photo-sensitive cell of the image sensor, wherein said information comprises one or more of: a colour value of the given photo-sensitive cell, a depth value of the given photo-sensitive cell, a transparency value of the given photo-sensitive cell, an illuminance value (namely, a luminance value or a brightness value) of the given photo-sensitive cell. The colour value could, for example, be Red-Green-Blue (RGB) values, Red-Green-Blue-Alpha (RGB-A) values, Cyan-Magenta-Yellow-Black (CMYK) values, Red-Green-Blue-Depth (RGB-D) values, or similar. In some implementations, the image data is RAW image data that has been read out from the image sensor. The term "RAW image data" refers to image data that is unprocessed (or may be minimally processed) when obtained from the image sensor. In other implementations, the image data is partially-processed image data that is generated upon performing certain image signal processing (ISP) on the RAW image data, for example, in an ISP pipeline. The image data and its forms (such as the RAW image data) are well-known in the art.

It will be appreciated that the plurality of photo-sensitive cells could, for example, be arranged in a rectangular two-dimensional (2D) grid, a polygonal arrangement, a circular arrangement, an elliptical arrangement, a freeform arrangement, or the like, on the image sensor. In an example, the image sensor may comprise 25 megapixels arranged in the rectangular 2D grid (such as a 5000×5000 grid) on the photo-sensitive surface. Optionally, when the plurality of photo-sensitive cells are arranged in the rectangular 2D grid, the image data is read out in a line-by-line manner.

Optionally, the image sensor is a part of a camera that is employed to capture sub-image(s). Optionally, the camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the camera is implemented as a depth camera. Examples of the depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. In an example, the camera may be implemented as a combination of the visible-light camera and the depth camera.

Throughout the present disclosure, the term "colour filter array" refers to a pattern of colour filters arranged in front of the plurality of photo-sensitive cells of the photo-sensitive surface, wherein the colour filter array (CFA) allows only specific wavelengths of light to pass through a given colour filter to reach a corresponding photo-sensitive cell of the photo-sensitive surface, for capturing corresponding image data. The CFA is well-known in the art. Typically, the photo-sensitive surface of the image sensor has millions of photo-sensitive cells.

It will be appreciated that the CFA comprises a plurality of smallest repeating unit, wherein a given smallest repeating unit is a smallest grid of colour filters that is repeated throughout the CFA. In other words, the smallest repeating unit may be understood as a building block that gets repeated (for example, horizontally and/or vertically) to form an entirety of the CFA. The given smallest repeating unit may, for example, be an M×N array of colour filters. In an example, for sake of better understanding and clarity, a given portion of the CFA may comprise 12 smallest repeating units arranged in a 3×4 array, wherein a given smallest repeating unit from amongst the 12 smallest repeating units is a 3×2 array of colour filters. In such an example, a given smallest repeating unit comprises 6 colour filters, and the CFA comprises 72 colour filters.

In some implementations, the colour filters of the at least three different colours comprise at least one blue colour filter, at least one green colour filter, and at least one red colour filter. In some examples, the at least one green colour filter could comprise at least two green colour filters. The colour filters of the at least three different colours are different from a Bayer CFA. The Bayer CFA is well-known in the art. In other implementations, the colour filters of the at least three different colours comprise at least one cyan colour filter, at least one magenta colour filter, and at least one yellow colour filter. In some examples, the at least one magenta colour filter could comprise at least two magenta colour filters.

Optionally, the CFA further comprises at least one other colour filter that allows to pass through at least one of: (i) at least three wavelengths corresponding to respective ones of the at least three different colours, (ii) at least one infrared wavelength. It will be appreciated that the at least one other colour filter that allows to pass through the at least three wavelengths simultaneously, can be understood to be a white colour filter or a near-white colour filter. Furthermore, the at least one other colour filter that allows to pass through the at least one infrared wavelength (for example, lying in an infrared wavelength range) can be understood to be an infrared colour filter.

Notably, the at least one processor controls an overall operation of the imaging system. The at least one processor is communicably coupled to at least the image sensor. Optionally, the at least one processor is implemented as an image signal processor. In an example, the image signal processor may be a programmable digital signal processor (DSP). Alternatively, optionally, the at least one processor is implemented as a cloud server (namely, a remote server) that provides a cloud computing service.

Notably, when the at least one processor employs the subsampling in at least the region of the photo-sensitive surface, the image data is selectively read out from at least the region of the photo-sensitive surface. In other words, the image data is read out from only some photo-sensitive cells in at least said region, instead of reading out the image data from each and every photo-sensitive cell in at least said region.

In particular, the at least one processor reads out those photo-sensitive cells that correspond to the first set of lines in the CFA, wherein the given line in the first set is one of: an odd line in the CFA, an even line in the CFA, the given line in the first set being the row or the column having the colour filters of each of the at least three different colours. It is to be understood that the odd line in the CFA could be an odd row of the CFA or an odd column of the CFA, whereas the even line in the CFA could be an even row of the CFA or an even column of the CFA. In other words, a given line in the CFA is defined with respect to a given row of the CFA or a given column of the CFA. Optionally, at least one of: rows of the CFA, columns of the CFA comprise the colour filters of each of the at least three different colours. It will be appreciated that there could be a CFA in which all the odd lines and/or all the even lines except one odd line and/or one even line (for example, near an edge of the CFA) have the colour filters of each of the at least three different colours. Thus, in such a case, the first set of lines may comprise the one odd line or the one even line (depending on whether the first set of lines are the odd lines or the even lines in the CFA) that does not have the colour filters of each of the at least three different colours.

In addition to this, the at least one processor does not read out (namely, skips) those photo-sensitive cells that correspond to the second set of lines in the CFA, wherein a given line in the second set is another of: the odd line in the CFA, the even line in the CFA. It is to be understood that since the at least one processor does not read out the image data from those photo-sensitive cells that correspond to the second set, the given line in the second set is a row or a column that may or may not have the colour filters of each of the at least three different colours. In other words, it is irrelevant whether or not the lines in the second set have colour filters of each of the at least three different colours, as reading out the image data from the second set is anyway skipped. As an example, there could be a CFA in which the lines in the first set comprise blue colour filters, green colour filters, and red colour filters, whereas the lines in the second set comprise only green colour filters. It will be appreciated that such a CFA having a higher number of green colour filters as compared to other colour filters could work in practice, as a green colour is a prominent colour for having accurate colour reproduction and improved resolution in an image.

As an example, for sake of simplicity and better understanding, the CFA may be a 6×6 array of colour filters. Herein, the image data may be read out from those photo-sensitive cells that correspond to odd rows (namely, a first row, a third row, and a fifth row) in the CFA, and the image data may not be read out (i.e., skipped) from those photo-sensitive cells that correspond to even rows (namely, a second row, a fourth row, and a sixth row) in the CFA.

Beneficially, when the subsampling is performed in the aforesaid manner, a processing time for selectively reading out the image data from at least the region of the photo-sensitive surface is considerably lesser, as compared to a processing time for reading out the image data from each and every photo-sensitive cell in at least said region. In addition to this, reading out (and processing) the image data from those photo-sensitive cells that correspond to the first set of lines in the CFA, enables in achieving a high visual quality (for example, in terms of a native resolution, a high contrast, a realistic and accurate colour reproduction, and the like) in corresponding pixels of the image (that is generated upon processing the image data, as discussed later). This is because the colour filters of the at least three different colours (in the lines of the first set) facilitates in providing better colour reproduction and resolution in the corresponding pixels of the image. It will be appreciated that such a selective read out of the image data in at least said region also facilitates in providing a high frame rate of images. This implementation has been also illustrated in conjunction with FIGS. 5A, 5B, 5C, 5D, and 5E, for sake of better understanding and clarity. It will also be appreciated that the aforesaid subsampling is particularly beneficial for a CFA that is customized for subsampling purposes (i.e., the CFA having the first set of lines and the second set of lines, as described earlier), as compared to employing a standard CFA (for example, such as a Bayer CFA) for the subsampling purposes. This is because improved image quality is obtained by employing the aforesaid CFA, as compared to employing the Bayer CFA wherein, typically, photo-sensitive cells that correspond to two rows or two columns of colour filters are skipped, and photo-sensitive cells that correspond to subsequent two rows or two columns of colour filters are read out. This often results in a considerable gap of unread image data i.e., greater amount of image data is to be interpolated, which results in poorer image quality.

Notably, upon reading out the image data, said image data is processed to generate the image. It will be appreciated that a given image is a visual representation of the real-world environment. The term "visual representation" encompasses colour information represented in the given image, and additionally optionally other attributes associated with the given image (for example, such as depth information, luminance information, transparency information (namely, alpha values), polarization information and the like).

Optionally, when processing the image data, the at least one processor is configured to perform interpolation and demosaicking, and optionally, other image signal processes (for example, in the ISP pipeline) on the image data, to generate the image. The interpolation is performed because the image data is obtained (by the at least one processor) as subsampled image data. The interpolation is well-known in the art. Upon performing the interpolation, the demosaicking is performed to generate a set of complete colour information (for example, such as RGGB colour information or similar) for each pixel in the image. The demosaicking is well-known in the art. In some implementations, the interpolation is performed prior to the demosaicking. In other implementations, the demosaicking and the interpolation are combined as a single operation, for example, when at least one neural network is to be employed (by the at least one processor) for performing the demosaicking and the interpolation. Optionally, the at least one processor is configured to employ the at least one neural network for processing the image data. It will be appreciated that the at least one processor is configured to employ at least one image processing algorithm for performing the interpolation and/or the demosaicking. In this regard, the at least one image processing algorithm may be a modified version of image processing algorithms that are well-known in the art for performing the interpolation and/or the demosaicking. The at least one image processing algorithm may also comprise at least one of: an image denoising algorithm, an interpolation algorithm, an image sharpening algorithm, a colour conversion algorithm, an auto white balancing algorithm, a deblurring algorithm, a contrast enhancement algorithm, a low-light enhancement algorithm, a tone mapping algorithm, a super-resolution algorithm, an image compression algorithm. The aforesaid image processing algorithms are well-known in the art. Techniques for processing the image data for generating images are well-known in the art.

Optionally, the given line in the first set is a row of the colour filter array, and wherein another given line in the first set comprising colour filters of each of the at least three different colours is a column of the colour filter array. In this regard, some lines in the first set comprise rows of the CFA, while other lines in the first set comprise columns of the CFA, wherein both said rows and said columns have the colour filters of each of the at least three different colours. For example, the first set of lines comprises even rows as well as even columns of the CFA. The technical benefit of such an implementation is that the subsampling could be performed in a row-wise manner and/or in a column-wise manner. This may, particularly, be beneficial when performing the subsampling in a peripheral region of the photo-sensitive surface, the peripheral region surrounding a central region (for example, in case of fixed foveation implementations) of the photo-sensitive surface or a gaze region (for example, in case of active foveation implementations) of the photo-sensitive surface. For example, for the peripheral region, the subsampling could be performed by skipping read out from those photo-sensitive cells that correspond to both even rows and even columns of the CFA, wherein both the even rows and the even columns of the CFA have the colour filters of each of the at least three different colours. However, in such an example, for the central region or the gaze region, the subsampling could be performed by skipping read out from those photo-sensitive cells that correspond to only the even rows or only the even columns of the CFA. Notably, in such a case, a given line in the second set comprising colour filters of each of the at least three different colours is a row of the CFA, and another given line in the second set comprising colour filters of each of the at least three different colours is a column of the CFA. In this regard, all rows and all columns of the CFA (namely, even rows as well as odd rows, and even columns as well as odd columns) have the colour filters of each of the at least three different colours. This has been illustrated in conjunction with FIGS. 5D and 5E, for sake of better understanding and clarity.

Optionally, the at least one processor is configured to select the first set of lines and the second set of lines as sets of at least one of: rows, columns, based on whether colour filters of each of the at least three different colours are arranged in rows, columns, or both rows and columns. In this regard, depending on how the colour filters of each of the at least three different colours are arranged in the CFA, the at least one processor selects whether the first set and the second set comprise sets of rows, sets of columns, or both sets of rows and sets of columns. It will be appreciated that the aforesaid selection of the first set and the second set facilitates the at least one processor in performing the subsampling accurately and accordingly, as the at least one processor would have knowledge on whether the subsampling is to be performed in a row-wise manner, a column-wise manner, or a combination of both the row-wise manner and the column-wise manner. Moreover, selecting the first set and the second set according to the aforesaid basis facilitates in providing better colour reproduction and resolution in corresponding pixels of the image, due to a presence of the colour filters of the at least three different colours.

In a first implementation, when the colour filters of each of the at least three different colours are arranged in only rows of the CFA (while columns of the CFA do not have the colour filters of each of the at least three different colours), the first set and the second set are selected as sets of rows (and not as sets of columns). This has been illustrated in conjunction with FIGS. 5A and 5C, for sake of better understanding and clarity. In a second implementation, when the colour filters of each of the at least three different colours are arranged in only columns of the CFA (while rows of the CFA do not have the colour filters of each of the at least three different colours), the first set and the second set are selected as sets of columns (and not as sets of rows). This has been illustrated in conjunction with FIG. 5B, for sake of better understanding and clarity. In a third implementation, when the colour filters of each of the at least three different colours are arranged in both rows and columns of the CFA, the first set and the second set are selected as sets of rows as well as columns. This has been illustrated in conjunction with FIG. 5E, for sake of better understanding and clarity. It will be appreciated that for the third implementation, the at least one processor could alternatively select the first set and the second set, based on a subsampling density in at least the region of the photo-sensitive surface. As an example, for a 50 percent subsampling density, when reading out the image data, only the rows or only the columns of the CFA may be skipped in an alternating manner. As an example, for a 25 percent subsampling density, when reading out the image data, both the rows and the columns may be skipped in an alternating manner.

The term "subsampling density" refers to a number of photo-sensitive cells that are to be read out (namely, sampled) from at least the region of the photo-sensitive surface per unit area. In this regard, said region may be expressed in terms of a total number of photo-sensitive cells, a number of photo-sensitive cells in both horizontal and vertical dimensions, units of length, or similar. For example, the subsampling density may be 2 photo-sensitive cells per 10 photo-sensitive cells, 4 photo-sensitive cells per 4×4 grid of photo-sensitive cells, 5 photo-sensitive cells per 50 square micrometres of the image sensor, or similar. Greater the subsampling density, greater is the number of photo-sensitive cells that would be read out from at least the region of the photo-sensitive surface per unit area, and vice versa.

In an embodiment, the at least one processor is configured to:

- obtain information indicative of a gaze direction of a user;
- determine a gaze region and a peripheral region in the photo-sensitive surface of the image sensor, based on the gaze direction; and
- select the peripheral region as said region of the photo-sensitive surface in which the subsampling is to be employed.

In this regard, the subsampling is employed only in the peripheral region, and a full sampling is employed in the gaze region. This means only some photo-sensitive cells are read out from the peripheral region, whereas (almost) each photo-sensitive cell is read out from the gaze region. Since pixels in the image (namely, a portion of the image) that correspond to the gaze region would be perceived with high visual acuity by a fovea of the user's eye, as compared to pixels in the image (namely, another portion of the image) that correspond to the peripheral region, it would be beneficial to employ the subsampling only in the peripheral region, and the full sampling in the gaze region. As a result, better colour reproduction is obtained for the (gaze-contingent) portion of the image that correspond to the gaze region, and minimal flicker (due to reduced noise) is obtained for another portion of the image that correspond to the peripheral region. In this regard, the (non-subsampled) image data that is obtained for the gaze region would be highly comprehensive and information-rich, as compared to the (subsampled) image data that is obtained for the peripheral region. Optionally, when processing the non-subsampled image data, the at least one processor is configured to perform only demosaicking on the non-subsampled image data. An image quality of the image so generated (upon processing the image data for both the gaze region and the peripheral region) emulates image viewing quality and characteristics of human visual system. This may improve a viewing experience of the user (for example, in terms of realism and immersiveness), when the image is displayed to the user.

Optionally, the at least one processor is configured to obtain, from a client device, the information indicative of the gaze direction. The client device could be implemented, for example, as a head-mounted display (HMD) device. Optionally, the client device comprises gaze-tracking means. The term "gaze direction" refers to a direction in which a given eye of the user is gazing. Such a gaze direction may be a gaze direction of a single user of a client device, or be an average gaze direction for multiple users of different client devices. The gaze direction may be represented by a gaze vector. Furthermore, the term "gaze-tracking means" refers to specialized equipment for detecting and/or following gaze of user's eyes. The gaze-tracking means could be implemented as contact lenses with sensors, cameras monitoring a position, a size and/or a shape of a pupil of the user's eye, and the like. The gaze-tracking means are well-known in the art. The term "head-mounted display" device refers to specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses augmented reality (AR), mixed reality (MR), and the like. It will be appreciated that when the imaging system is remotely located from the client device, the at least one processor obtains the information indicative of the gaze direction from the client device. Alternatively, when the imaging system is integrated into the client device, the at least one processor obtains the information indicative of the gaze direction from the gaze-tracking means of the client device.

Optionally, the gaze direction is a current gaze direction. Alternatively, optionally, the gaze direction is a predicted gaze direction. It will be appreciated that optionally the predicted gaze direction is predicted, based on a change in user's gaze, wherein the predicted gaze direction lies along a direction of the change in the user's gaze. In such a case, the change in the user's gaze could be determined in terms of a gaze velocity and/or a gaze acceleration of the given eye, using information indicative of previous gaze directions of the given eye and/or the current gaze direction of the given eye. Yet alternatively, optionally, the gaze direction is a default gaze direction, wherein the default gaze direction is straight towards a centre of a field of view of the image sensor. In this regard, it is considered that the gaze of the user's eye is, by default, typically directed towards a centre of his/her field of view. In such a case, a central region of a field of view of the user is resolved to a much greater degree of visual detail, as compared to a remaining, peripheral region of the field of view of the user. It is to be understood that a gaze position corresponding to the default gaze direction lies at a centre of the photo-sensitive surface.

Optionally, when determining the gaze region and the peripheral region in the photo-sensitive surface, the at least one processor is configured to map the gaze direction of the user onto the photo-sensitive surface. The term "gaze region" refers to a region in the photo-sensitive surface onto which the gaze direction is mapped. The gaze region may, for example, be a central region of the photo-sensitive surface, a top-left region of the photo-sensitive surface, a bottom-right region of the photo-sensitive surface, or similar. The term "peripheral region" refers to another region in the photo-sensitive surface that surrounds the gaze region. The another region may, for example, remain after excluding the gaze region from the photo-sensitive surface. This has been illustrated in conjunction with FIG. 4, for sake of better understanding and clarity.

It will be appreciated that the gaze region and the peripheral region are optionally selected dynamically, based on the gaze direction. In this regard, the gaze region corresponds to a gaze area (i.e., a region of interest), whereas the peripheral region corresponds to a peripheral area surrounding the gaze area. Such a dynamic manner of selecting the gaze region and the peripheral region emulates a way in which the user actively focuses within his/her field of view. Optionally, an angular width of the peripheral region lies in a range of 12.5-50 degrees from a gaze position to 45-110 degrees from the gaze position, while an angular extent of the gaze region lies in a range of 0 degree from the gaze position to 2-50 degrees from the gaze position, wherein the gaze position is a position on the photo-sensitive surface onto which the gaze direction is mapped. Determining the gaze region and the peripheral region in the photo-sensitive surface is well-known in the art. Alternatively, in fixed-foveation implementations, the gaze region is determined in a fixed manner, according to a centre of the photo-sensitive surface. In this regard, the gaze direction is assumed to be directed along an optical axis of the camera (i.e., directed straight towards a centre of the image). Therefore, the at least one processor is configured to determine the gaze region at the centre of the photo-sensitive surface. This is because the user's gaze is generally directed towards a centre of his/her field of view. When the user wants to view object(s) in a periphery of his/her field of view, the user typically turns his/her head in a manner that said object(s) lie at a centre of his/her current field of view. In such a case, a central portion of the user's field of view is resolved to a much greater degree of visual detail by the fovea of the user's eye, as compared to a peripheral portion of the user's field of view. The aforesaid fixed manner of determining the first region beneficially emulates a way in which users generally focus within their fields of view. Optionally, an angular width of the peripheral region lies in a range of 12.5-50 degrees from a gaze position to 45-110 degrees from the gaze position, while an angular extent of the gaze region lies in a range of 0 degree from the gaze position to 2-50 degrees from the gaze position, wherein the gaze position is a position on the photo-sensitive surface onto which the gaze direction is mapped.

Alternatively, optionally, the at least one processor is configured to employ the subsampling in both the peripheral region and the gaze region (i.e., in an entirety of the photo-sensitive surface). In this regard, a subsampling density in the peripheral region could be different from a subsampling density in the gaze region. This implementation is discussed later in detail. Yet alternatively, optionally, the at least one processor is configured to employ the subsampling in an overlapping region that corresponds to an overlapping field of view between the image sensor and another image sensor. It will be appreciated that the overlapping field of view between the image sensor and the another image sensor represents a region in the real-world environment that lies in both a first field of view of the image sensor and a second field of view of the another image sensor. This means that objects or their portions present in an overlapping region would be visible from the first field of view and the second field of view, and thus image signals pertaining to such objects or their portion would be captured by at least some photo-sensitive cells corresponding to the overlapping field of view.

In another embodiment, the at least one processor is configured to:

- obtain information indicative of a gaze direction of a user; and
- determine a gaze region and a peripheral region in the photo-sensitive surface of the image sensor, based on the gaze direction, wherein when employing the subsampling, the at least one processor is configured to employ the subsampling in an entirety of the photo-sensitive surface with a first subsampling density in the gaze region and with a second subsampling density in the peripheral region, the first subsampling density being higher than the second subsampling density.

In this regard, when the first subsampling density (in the gaze region) is optionally higher than the second subsampling density (in the peripheral region), it means that an amount of image data that is read out from the gaze region per unit area is greater, as compared to an amount of image data that is read out from the peripheral region per unit area. This would occur when a number of photo-sensitive cells that are to be read from the gaze region per unit area are greater, as compared to a number of photo-sensitive cells that are to be read from the peripheral region per unit area. This means that gaze-contingent image data is obtained when the subsampling is employed in the aforesaid manner. Thus, a higher subsampling density would be required for accurately and reliably generating image data corresponding to unread photo-sensitive cells in the gaze region, using image data corresponding to read out photo-sensitive cells in the gaze region portion. This is because gaze-contingent pixels (that correspond to the gaze region) would be perceived in the image with high visual acuity by a fovea of the user's eye, as compared to non-gaze-contingent pixels (that correspond to the peripheral region) in the image. An image quality of the (full) image so generated emulates image viewing quality and characteristics of the human visual system. In particular, the generated image has a spatially variable resolution, wherein a first region of the image corresponding to the gaze region has a first resolution that is higher than a second resolution of a second region of the image that corresponds to the peripheral region. It will be appreciated that employing the subsampling in the entirety of the photo-sensitive surface potentially reduces a processing time and utilization of processing resources of the at least one processor. In an example, the first subsampling density may be 50 percent, and the second subsampling density may be 25 percent.

Optionally, for the first subsampling density to be higher than the second subsampling density, the at least one processor is configured to perform the subsampling by skipping alternate rows or alternate columns in the gaze region, and by skipping both alternate rows and alternate columns in the peripheral region. In an example, for a given image, 6 photo-sensitive cells per 3×3 grid of photo-sensitive cells may be read out in the gaze region, whereas only 3 pixels per 3×3 grid of pixels may be read out in the peripheral region. Information pertaining to the gaze direction and determination of the gaze region and the peripheral region has been already discussed earlier in detail.

The present disclosure also relates to the method of the second aspect as described above. Various embodiments and variants disclosed above, with respect to the aforementioned imaging system of the first aspect, apply mutatis mutandis to the method of the second aspect.

Optionally, in the method, the given line in the first set is a row of the colour filter array, and wherein another given line in the first set comprising colour filters of each of the at least three different colours is a column of the colour filter array.

Optionally, the method further comprises selecting the first set of lines and the second set of lines as sets of at least one of: rows, columns, based on whether colour filters of each of the at least three different colours are arranged in rows, columns, or both rows and columns.

Optionally, the method further comprises:

obtaining information indicative of a gaze direction of a user;

determining a gaze region and a peripheral region in the photo-sensitive surface of the image sensor, based on the gaze direction; and selecting the peripheral region as said region of the photo-sensitive surface in which the subsampling is to be employed.

Optionally, the method further comprises:

obtaining information indicative of a gaze direction of a user; and determining a gaze region and a peripheral region in the photo-sensitive surface of the image sensor, based on the gaze direction, wherein the step of employing the subsampling further comprises employing the subsampling in an entirety of the photo-sensitive surface with a first subsampling density in the gaze region and with a second subsampling density in the peripheral region, the first subsampling density being higher than the second subsampling density.

It will be appreciated that the aforementioned first aspect and the aforementioned second aspect cover a first implementation of the imaging system and the method, respectively. There will now be provided a third aspect and a fourth aspect (as described hereinbelow) that cover a second implementation of the imaging system and the method, respectively.

In a third aspect, an embodiment of the present disclosure provides an imaging system comprising:

an image sensor comprising:

a plurality of photo-sensitive cells arranged on a photo-sensitive surface of the image sensor; and a colour filter array comprising sets of repeating rows or columns, wherein a given set of repeating rows or columns comprises N rows or columns that repeat consecutively; and at least one processor configured to:

read out image data from the image sensor, wherein when reading out, the at least one processor is configured to employ subsampling in at least a region of the photo-sensitive surface, by:

reading out the image data from those photo-sensitive cells that correspond to at most N−1 rows or columns out of the N rows or columns in each set of repeating rows or columns; and skipping read out from those photo-sensitive cells that correspond to a remainder of the N rows or columns in each set of repeating rows or columns; and process the image data to generate an image.

In a fourth aspect, an embodiment of the present disclosure provides a method comprising:

reading out image data from an image sensor, wherein the image sensor comprises a plurality of photo-sensitive cells arranged on a photo-sensitive surface of the image sensor, and a colour filter array comprising sets of repeating rows or columns, wherein a given set of repeating rows or columns comprises N rows or columns that repeat consecutively, and wherein the step of reading out comprises employing subsampling in at least a region of the photo-sensitive surface, by:

reading out the image data from those photo-sensitive cells that correspond to at most N−1 rows or columns out of the N rows or columns in each set of repeating rows or columns; and skipping read out from those photo-sensitive cells that correspond to a remainder of the N rows or columns in each set of repeating rows or columns; and processing the image data to generate an image.

The present disclosure provides the aforementioned imaging system and the aforementioned method incorporating alternate subsampling in colour filter arrays, to generate high-quality, realistic images at a high framerate, by way of processing image data that is read out by employing subsampling, in computationally-efficient and time-efficient manner. Herein, when the subsampling is performed, a processing time for selectively reading out the image data from at least the region of the photo-sensitive surface is considerably lesser, as compared to a processing time for reading out the image data from each and every photo-sensitive cell in at least said region. In addition to this, reading out (and processing) the image data from those photo-sensitive cells that correspond to the at most N−1 rows or columns, enables in accurately and reliably generating image data corresponding to unread photo-sensitive cells in at least said region, using image data corresponding to read out photo-sensitive cells. This may facilitate in achieving high visual quality (for example, in terms of a native resolution, a high contrast, a realistic and accurate colour reproduction, and the like) in the corresponding pixels of the image. It will be appreciated that the aforesaid manner of performing the subsampling is beneficial when employing a Bayer CFA or a non-Bayer CFA. A selective read out of the image data facilitates in providing a high frame rate of images, whilst reducing computational burden, delays, and excessive power consumption. The imaging system and the method are susceptible to cope with visual quality requirements, for example, such as a high resolution (such as a resolution higher than or equal to 60 pixels per degree), a small pixel size, and a large field of view, whilst achieving a high (and controlled) frame rate (such as a frame rate higher than or equal to 90 FPS). The imaging system and the method are simple, robust, fast, reliable, support real-time alternate subsampling in CFAs, and can be implemented with ease.

There will now be provided details of various operations as described earlier with respect to the aforementioned third aspect. It is to be understood that some common details of the aforementioned third aspect have already been described earlier with respect to the aforementioned first aspect, and have not been described again, for sake of brevity and avoiding repetition.

It will be appreciated that the CFA comprising the sets of repeating rows or columns could be a Bayer CFA (for example, a 4C Bayer CFA (also referred to as "quad" or "tetra", wherein a group of 2×2 pixels has a same colour filter), a 9C Bayer CFA (also referred to as "nona", wherein a group of 3×3 pixels has a same colour filter), a 16C Bayer CFA (also referred to as "hexadeca", wherein a group of 4×4 pixels has a same colour filter). Alternatively, the CFA comprising the sets of repeating rows or columns could be a similar non-Bayer CFA comprising colour filters of at least three different colours (for example, such as a Red-Clear-Clear-Blue (RCCB)-based CFA, a Red-Yellow-Yellow-Blue (RYYB)-based CFA, and the like). In an example, for a 4C Bayer CFA, a given set of repeating rows comprise two rows or two columns of colour filters that repeat consecutively (i.e., N=2). In another example, for a 9C Bayer CFA, a given set of repeating rows comprises three rows or three columns of colour filters that repeat consecutively (i.e., N=3). These examples have been also illustrated in conjunction with FIGS. 6A and 6B, for sake of better understanding and clarity. It is to be understood that typically, a single row or column in the Bayer CFA does not have colour filters of each of at least three different colours.

Notably, when the at least one processor employs the subsampling in at least the region of the photo-sensitive surface, the image data is selectively read out from at least the region of the photo-sensitive surface. In particular, the at least one processor reads out those photo-sensitive cells that correspond to any of 1 row or column to N−1 rows or columns, out of the N rows or columns in each set of the repeating rows or columns. For example, for N=3 (such as in case of the 9C Bayer CFA), the at least one processor may read out from 1 or 2 rows or columns out of 3 rows or columns in each set of the repeating rows or columns. Similarly, for N=2 (such as in case of the 4C Bayer CFA), the at least one processor may read out from any 1 row or column out of 2 rows or columns in each set of the repeating rows or columns.

In addition to this, the at least one processor does not read out (namely, skips) those photo-sensitive cells that correspond to remaining row(s) or column(s) out of the N rows or columns in each set of the repeating rows or columns. In an example, for N=2 (such as in case of the 4C Bayer CFA), the at least one processor may read out from a first row R1 out of two rows R1 and R2, and may skip read out from a (remaining) second row R2 out of the two rows R1 and R2, in a given set of the repeating rows. For sake of better understanding and clarity, this example has been also illustrated in conjunction with FIG. 6A. Alternatively, in such an example, the at least one processor may read out from a second column C2 out of two columns C1 and C2, and may skip read out from a (remaining) first column C1 out of the two columns C1 and C2, in a given set of the repeating columns.

In another example, for N=3 (such as in case of the 9C Bayer CFA), there could six different scenarios for reading out the image data. In a first scenario, the at least one processor may read out from a first column C1 out of three columns C1, C2, and C3, and may skip read out from a second column C2 and a third column C3. In a second scenario, the at least one processor may read out from a second columns C2 out of three columns C1, C2, and C3, and may skip read out from a first column C1 and a third column C3. In a third scenario, the at least one processor may read out from a third column C3 out of three columns C1, C2, and C3, and may skip read out from a first column C1 and a second column C2. In a fourth scenario, the at least one processor may read out from a first column C1 and a second column C2 out of three columns C1, C2, and C3, and may skip read out from a third column C3. In a fifth scenario, the at least one processor may read out from a second column C2 and a third column C3 out of three columns C1, C2, and C3, and may skip read out from a first column C1. In a sixth scenario, the at least one processor may read out from a first column C1 and a third column C3 out of three columns C1, C2, and C3, and may skip read out from a second column C2. For sake of better understanding and clarity, only the sixth scenario has been illustrated in conjunction with FIG. 6B. Such a manner of reading out and skipping the image data could alternatively be performed for a given set of the repeating rows in the 9C Bayer CFA.

Beneficially, when the subsampling is performed in the aforesaid manner, a processing time for selectively reading out the image data from at least the region of the photo-sensitive surface is considerably lesser, as compared to a processing time for reading out the image data from each and every photo-sensitive cell in at least said region. In addition to this, reading out (and processing) the image data from those photo-sensitive cells that correspond to the at most N−1 rows or columns, enables in accurately and reliably generating image data corresponding to unread photo-sensitive cells in at least said region, using image data corresponding to read out photo-sensitive cells. This may facilitate in achieving a high visual quality (for example, in terms of a native resolution, a high contrast, a realistic and accurate colour reproduction, and the like) in corresponding pixels of the image (that is generated upon processing the image data). It will be appreciated that such a selective read out of the image data in at least said region also facilitates in providing a high frame rate of images. It will also be appreciated that the aforesaid manner of performing the subsampling is beneficial when employing a Bayer CFA or a non-Bayer CFA.

Notably, upon reading out the image data, said image data is processed to generate the image in a similar manner as discussed earlier in detail, with respect to the aforementioned first aspect.

In an embodiment, the at least one processor is configured to:

- obtain information indicative of a gaze direction of a user;
- determine a gaze region and a peripheral region in the photo-sensitive surface of the image sensor, based on the gaze direction; and
- select the peripheral region as said region of the photo-sensitive surface in which the subsampling is to be employed.

In this regard, the subsampling is employed only in the peripheral region, and a full sampling is employed in the gaze region. This means only some photo-sensitive cells are read out from the peripheral region, whereas (almost) each photo-sensitive cell is read out from the gaze region. Since pixels in the image (namely, a portion of the image) that correspond to the gaze region would be perceived with high visual acuity by a fovea of the user's eye, as compared to pixels in the image (namely, another portion of the image) that correspond to the peripheral region, it would be beneficial to employ the subsampling only in the peripheral region, and the full sampling in the gaze region. As a result, better colour reproduction is obtained for the (gaze-contingent) portion of the image that correspond to the gaze region, and minimal flicker (due to reduced noise) is obtained for another portion of the image that correspond to the peripheral region. In this regard, the (non-subsampled) image data that is obtained for the gaze region would be highly comprehensive and information-rich, as compared to the (subsampled) image data that is obtained for the peripheral region. Optionally, when processing the non-subsampled image data, the at least one processor is configured to perform only demosaicking on the non-subsampled image data. An image quality of the image so generated (upon processing the image data for both the gaze region and the peripheral region) emulates image viewing quality and characteristics of human visual system. This may improve a viewing experience of the user (for example, in terms of realism and immersiveness), when the image is displayed to the user. Information pertaining to the gaze direction and determination of the gaze region and the peripheral region has been already discussed earlier in detail, with respect to the aforementioned first aspect.

In another embodiment, the at least one processor is configured to:

obtain information indicative of a gaze direction of a user; and determine a gaze region and a peripheral region in the photo-sensitive surface of the image sensor, based on the gaze direction, wherein when employing the subsampling, the at least one processor is configured to employ the subsampling in an entirety of the photo-sensitive surface with a first subsampling density in the gaze region and with a second subsampling density in the peripheral region, the first subsampling density being higher than the second subsampling density.

In this regard, when the first subsampling density (in the gaze region) is optionally higher than the second subsampling density (in the peripheral region), it means that an amount of image data that is read out from the gaze region per unit area is greater, as compared to an amount of image data that is read out from the peripheral region per unit area. This would occur when a number of photo-sensitive cells that are to be read from the gaze region per unit area are greater, as compared to a number of photo-sensitive cells that are to be read from the peripheral region per unit area. This means that gaze-contingent image data is obtained when the subsampling is employed in the aforesaid manner. In such a case, a higher subsampling density in the gaze region would be required for accurately and reliably generating image data corresponding to unread photo-sensitive cells in the gaze region, using image data corresponding to read out photo-sensitive cells in the gaze region portion. This is because gaze-contingent pixels (that correspond to the gaze region) would be perceived in the image with high visual acuity by a fovea of the user's eye, as compared to non-gaze-contingent pixels (that correspond to the peripheral region) in the image. An image quality of the (full) image so generated emulates image viewing quality and characteristics of the human visual system. In particular, the generated image has a spatially variable resolution. It will be appreciated that employing the subsampling in the entirety of the photo-sensitive surface potentially reduces a processing time and utilization of processing resources of the at least one processor.

In an example implementation, for the first subsampling density to be higher than the second subsampling density, the at least one processor is configured to perform the subsampling, for example, for a 4C Bayer CFA wherein N=2, by: reading out from any one row out of two rows, and skipping read out from a remaining row out of the two rows, in the gaze region; reading out from any one row out of two rows, and skipping read out from a remaining row out of the two rows and also from any one column out of the two columns, in the peripheral region.

It will be appreciated that when N is greater than 2 (for example, in a case of a 9C Bayer CFA wherein N=3, a 16C Bayer CFA wherein N=4, and the like), for the first subsampling density to be higher than the second subsampling density, the at least one processor is configured to perform the subsampling by: reading out from N−1 rows out of the N rows, and skipping read out from only one row out of the N rows, in the gaze region; and reading out from only one row out of the N rows, and skipping read out from N−1 rows out of the N rows, in the peripheral region. Alternatively, the at least one processor is optionally configured to perform the subsampling by: reading out from N−1 columns out of the N columns, and skipping read out from only one column out of the N columns, in the gaze region; and reading out from only one column out of the N columns, and skipping read out from N−1 columns out of the N columns, in the peripheral region.

Optionally, in the first aspect and in the third aspect, when reading out the image data from photo-sensitive cells in at least a region of the photo-sensitive surface of the image sensor, the at least one processor is configured to employ a subsampling pattern. The term "subsampling pattern" refers to a software-based masking pattern that enables in selectively reading out photo-sensitive cells from (at least said region of the photo-sensitive surface) of the image sensor. In this regard, photo-sensitive cells whose locations are indicated in the subsampling pattern as skipped, are not read out from the image sensor (and thus image data for such photo-sensitive cells is not obtained), while photo-sensitive cells whose locations are indicated in the subsampling pattern as not skipped, are read out from the image sensor (and thus image data for such photo-sensitive cells is obtained). The subsampling pattern could be different for generating different regions of a same image. For example, a subsampling pattern employed for the gaze region could be different from a subsampling pattern employed for the peripheral region. Optionally, the subsampling pattern is a bit mask. As an example, in the subsampling pattern, '0' could indicate a photo-sensitive cell to be skipped and '1' could indicate a photo-sensitive cell to be read out. It will be appreciated that the subsampling pattern could be a non-regular pattern, wherein the non-regular pattern is a software-based masking pattern which indicates locations of irregularly-arranged (i.e., disorderly arranged) photo-sensitive cells in the image sensor that are to be read out. The subsampling pattern could alternatively be a random pattern, a gradient-type pattern, or a regular pattern. It will also be appreciated that the aforesaid subsampling could either be performed during reading out from the image sensor or be performed prior to conversion of RAW image data into a given colour space format (for example, such as an RGB format, a Luminance and two-colour differences (YUV) format, or the like) in the ISP pipeline. Both of the aforesaid ways of performing the subsampling are well-known in the art.

The present disclosure also relates to the method of the fourth aspect as described above. Various embodiments and variants disclosed above, with respect to the aforementioned imaging system of the third aspect, apply mutatis mutandis to the method of the fourth aspect.

Optionally, the method further comprises:

obtaining information indicative of a gaze direction of a user;

determining a gaze region and a peripheral region in the photo-sensitive surface of the image sensor, based on the gaze direction; and selecting the peripheral region as said region of the photo-sensitive surface in which the subsampling is to be employed.

Alternatively, optionally, the method further comprises:

obtaining information indicative of a gaze direction of a user; and determining a gaze region and a peripheral region in the photo-sensitive surface of the image sensor, based on the gaze direction, wherein the step of employing the subsampling further comprises employing the subsampling in an entirety of the photo-sensitive surface with a first subsampling density in the gaze region and with a second subsampling density in the peripheral region, the first subsampling density being higher than the second subsampling density.

DETAILED DESCRIPTION OF THE DRAWINGS

Referring to FIG. 1, illustrated is a block diagram of an architecture of an imaging system 100 incorporating alternate subsampling in colour filter arrays, in accordance with a first aspect and a third aspect of the present disclosure. The imaging system 100 comprises an image sensor 102 and at least one processor (for example, depicted as a processor 104). The image sensor 102 comprises a plurality of photo-sensitive cells 106 and a colour filter array 108. The processor 104 is communicably coupled to the image sensor 102. The processor 104 is configured to perform various operations, as described earlier with respect to the aforementioned first aspect or the aforementioned third aspect.

It may be understood by a person skilled in the art that FIG. 1 includes a simplified architecture of the imaging system 100, for sake of clarity, which should not unduly limit the scope of the claims herein. It is to be understood that the specific implementation of the imaging system 100 is provided as an example and is not to be construed as limiting it to specific numbers or types of image sensors, processors, photo-sensitive cells, and colour filter arrays. The person skilled in the art will recognize many variations, alternatives, and modifications of embodiments of the present disclosure.

Figure 2:
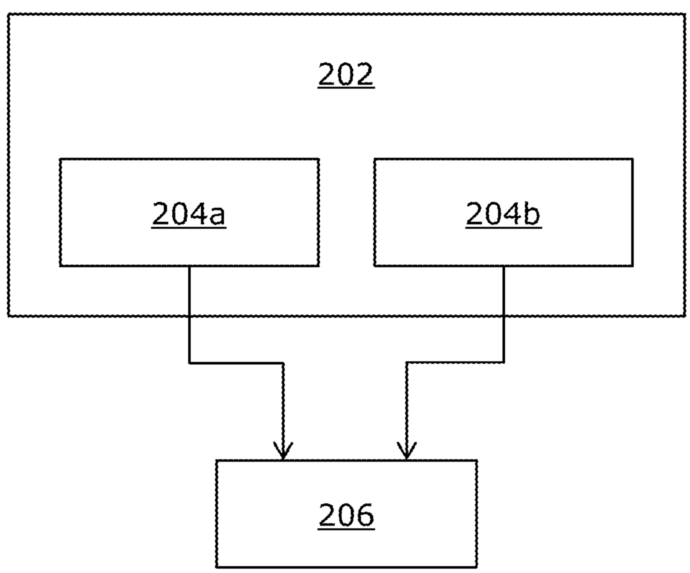
FIG. 2 illustrates steps of a method incorporating alternate subsampling in colour filter arrays, in accordance with a second aspect of the present disclosure.

Referring to FIG. 2, illustrated are steps of a method incorporating alternate subsampling in colour filter arrays, in accordance with a second aspect of the present disclosure. At step 202, image data is read out from an image sensor by employing subsampling in at least a region of a photo-sensitive surface of the image sensor. The image sensor comprises a plurality of photo-sensitive cells arranged on the photo-sensitive surface, and a colour filter array comprising colour filters of at least three different colours. Step 202 comprises steps 204*a* and 204*b*. In this regard, at step 204*a*, the image data is read out from those photo-sensitive cells that correspond to a first set of lines in the colour filter array, wherein a given line in the first set comprises colour filters of each of the at least three different colours, the given line being a row or a column of the colour filter array. Simultaneously, at step 204*b*, read out is skipped from those photo-sensitive cells that correspond to a second set of lines in the colour filter array, wherein the first set of lines comprises one of: odd lines in the colour filter array, even lines in the colour filter array, while the second set of lines comprises another of: the odd lines, the even lines. Steps 204*a* and 204*b* are performed simultaneously. At step 206, the image data is processed to generate an image.

The aforementioned steps are only illustrative and other alternatives can also be provided where one or more steps are added, one or more steps are removed, or one or more steps are provided in a different sequence without departing from the scope of the claims.

Figure 3:
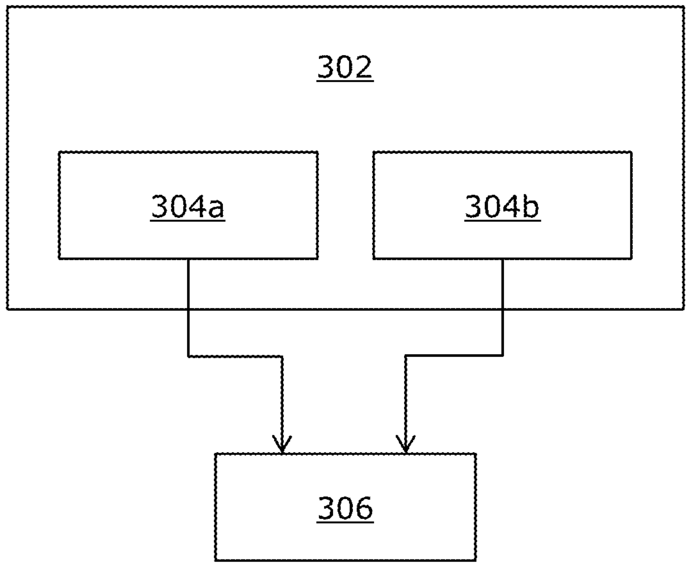
FIG. 3 illustrates steps of a method incorporating alternate subsampling in colour filter arrays, in accordance with a fourth aspect of the present disclosure.

Referring to FIG. 3, illustrated are steps of a method incorporating alternate subsampling in colour filter arrays, in accordance with a fourth aspect of the present disclosure. At step 302, image data is read out from an image sensor by employing subsampling in at least a region of a photo-sensitive surface of the image sensor. wherein the image sensor comprises a plurality of photo-sensitive cells arranged on a photo-sensitive surface of the image sensor, and a colour filter array comprising sets of repeating rows or columns, wherein a given set of repeating rows or columns comprises N rows or columns that repeat consecutively. Step 302 comprises steps 304*a* and 304*b*. In this regard, at step 304*a*, the image data is read out from those photo-sensitive cells that correspond to at most N−1 rows or columns out of the N rows or columns in each set of repeating rows or columns. Simultaneously, at step 304*b*, read out is skipped from those photo-sensitive cells that correspond to a remainder of the N rows or columns in each set of repeating rows or columns. Steps 304*a* and 304*b* are performed simultaneously. At step 306, the image data is processed to generate an image.

The aforementioned steps are only illustrative and other alternatives can also be provided where one or more steps are added, one or more steps are removed, or one or more steps are provided in a different sequence without departing from the scope of the claims.

Figure 4:
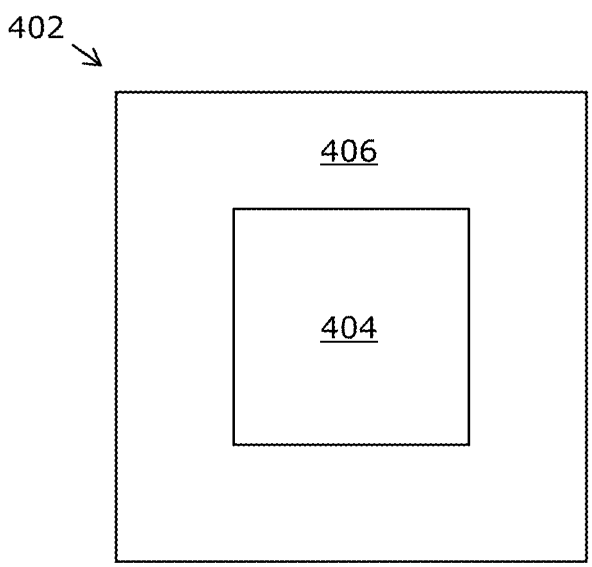
FIG. 4 illustrates different regions of a photo-sensitive surface of an image sensor, in accordance with an embodiment of all the aspects of the present disclosure.

Referring to FIG. 4, illustrated are different regions of a photo-sensitive surface 402 of an image sensor, in accordance with an embodiment of all the aspects of the present disclosure. The photo-sensitive surface 402 comprises a gaze region 404 and a peripheral region 406, wherein the peripheral region 406 surrounds the gaze region 404. The gaze region 404 and the peripheral region 406 are determined (by at least one processor), based on a gaze direction of a user. As an example, the gaze direction of the user may be at a centre of the photo-sensitive surface 402. It will be appreciated that in some implementations, when reading out image data from the photo-sensitive surface 402, subsampling is employed only in the peripheral region 406. In other implementations, when reading out image data from the photo-sensitive surface 402, subsampling is employed in an entirety of the photo-sensitive surface 402 with a first subsampling density in the gaze region 404, and with a second subsampling density in the peripheral region 406, the first subsampling density being higher than the second subsampling density.

Referring to FIGS. 5A, 5B, 5C, 5D, and 5E, illustrated is how subsampling is employed for different colour filter arrays (CFAs) 502*a*, 502*b*, 502*c*, 502*d*, and 502*e* when reading out image data from a region of a photo-sensitive surface of an image sensor, in accordance with various embodiments of the first aspect and the second aspect of the present disclosure. With reference to FIGS. 5A-5E, "B" refers to a blue colour filter, "G" refers to a green colour filter, and "R" refers to a red colour filter. It will be appreciated that in some implementations, a cyan colour filter, a magenta colour filter, and a yellow colour filter could also be employed instead of employing the blue colour filter, the green colour filter, and the red colour filter. It will also be appreciated that FIGS. 5A-5E illustrate only few examples of CFAs, for sake of clarity and better understanding. Other different types of CFAs could also be employed.

Figure 5A:
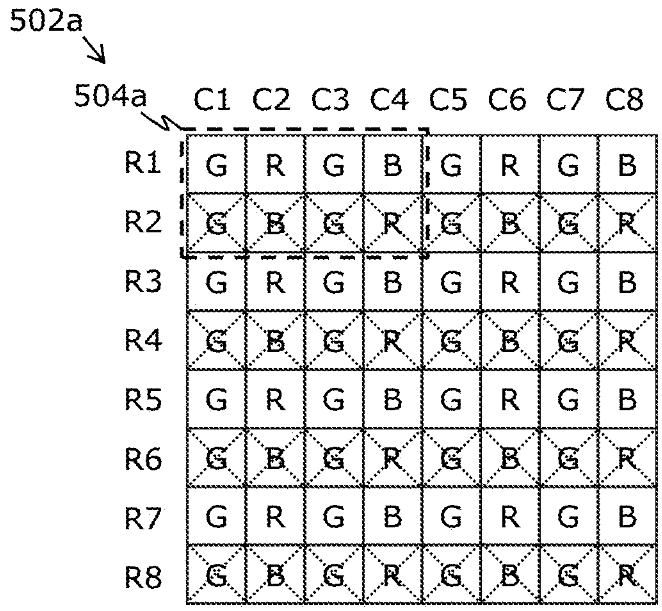
FIGS. 5A, 5B, 5C, 5D, and 5E illustrate how subsampling is employed for different colour filter arrays when reading out image data from a region of a photo-sensitive surface of an image sensor, in accordance with various embodiments of the first aspect and the second aspect of the present disclosure.
Figure 5B:
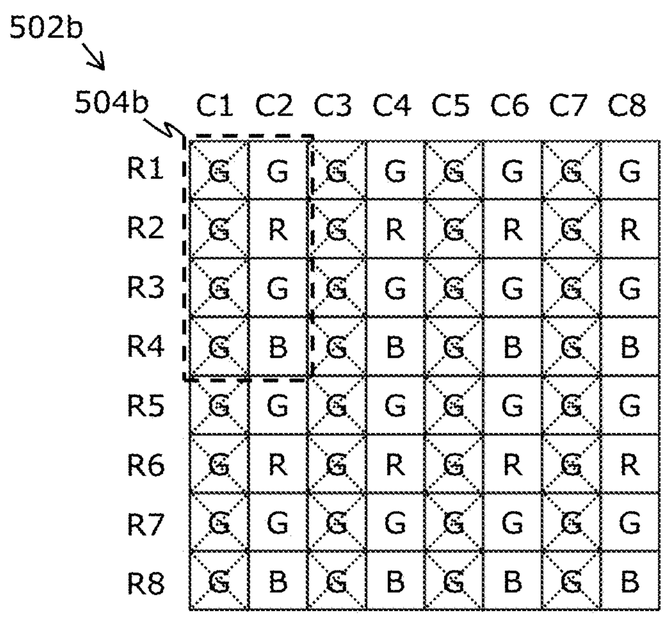
Figure 5C:
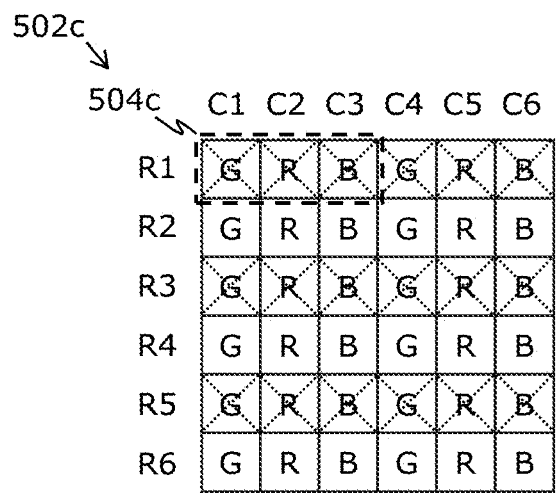
Figure 5D:
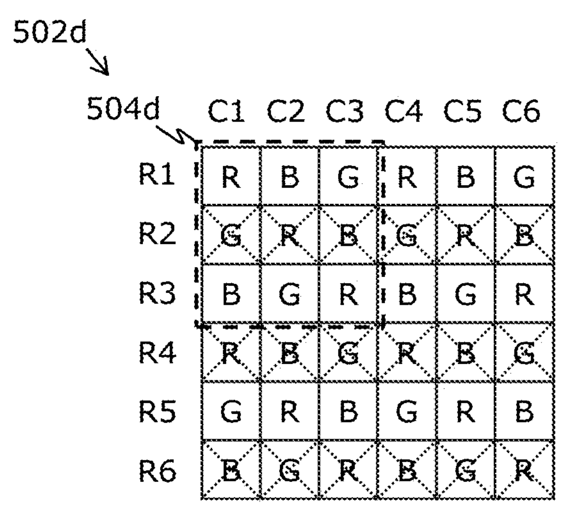
Figure 5E:
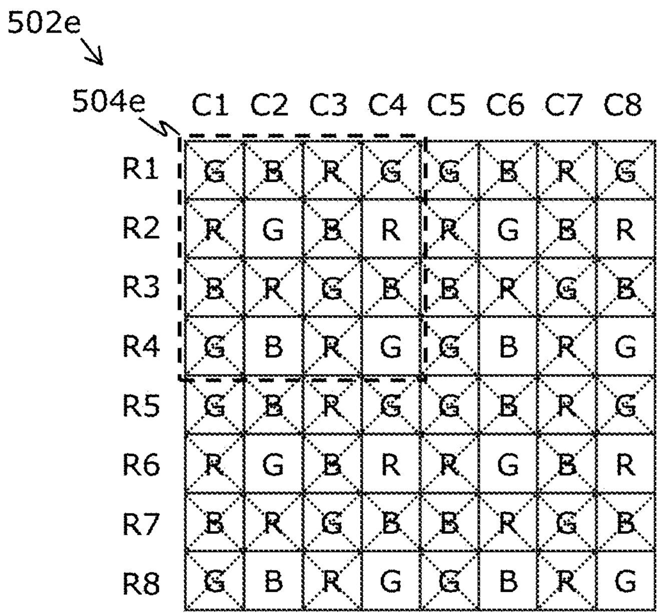

With reference to FIGS. 5A, 5B, and 5E, for sake of simplicity and clarity, parts of the CFAs 502*a*, 502*b*, and 502*e* are shown to correspond to the region of the photo-sensitive surface, wherein said region comprises 64 photo-sensitive cells arranged in an 8×8 grid, and wherein colour filters in said parts of the CFAs 502*a*, 502*b*, and 502*e* are arranged in front of respective ones of the 64 photo-sensitive cells. With reference to FIGS. 5C and 5D, for sake of simplicity and clarity, parts of the CFAs 502*c* and 502*d* are shown to correspond to the region of the photo-sensitive surface, wherein said region comprises 36 photo-sensitive cells arranged in a 6×6 grid, and wherein colour filters in said parts of the CFAs 502*c* and 502*d* are arranged in front of respective ones of the 36 photo-sensitive cells. It will be appreciated that a photo-sensitive surface of a typical image sensor has millions of photo-sensitive cells (namely, pixels).

With reference to FIG. 5A, the shown part of the CFA 502*a* comprises 64 colour filters arranged in an 8×8 array, wherein a given smallest repeating unit 504*a* (depicted as a 4×2 array of colour filters, using a dashed line box) is repeated throughout the CFA 502*a*, and wherein the given smallest repeating unit 504*a* comprises four green colour filters, two red colour filters, and two blue colour filters. The shown part of the CFA 502*a* has 8 rows R1, R2, R3, R4, R5, R6, R7, and R8, and has 8 columns C1, C2, C3, C4, C5, C6, C7, and C8, wherein each of the rows R1-R8 has colour filters of each of three different colours (namely, green colour filters, red colour filters, and blue colour filters), while each of the columns C1-C8 do not have the colour filters of each of the three different colours (for example, the columns C1, C3, C5, and C7 have only green colour filters, and the columns C2, C4, C6, and C8 have only red colour filters and blue colour filters). In this regard, when performing the subsampling, the image data can be read out from 32 photo-sensitive cells that correspond to odd rows (namely, the rows R1, R3, R5, and R7) in the shown part of the CFA 502*a*, while the image data is not read out (namely, is skipped) from remaining 32 photo-sensitive cells (crossed out as dotted 'X's) that correspond to even rows (namely, the rows R2, R4, R6, and R8) in the shown part of the CFA 502*a*. It is to be noted that for the CFA 502*a*, since the rows R1-R8 have the colour filters of each of the three different colours, the subsampling (namely, selective read out of the image data) is performed in a row-wise manner.

With reference to FIG. 5B, the shown part of the CFA 502*b* comprises 64 colour filters arranged in an 8×8 array, wherein a given smallest repeating unit 504*b* (depicted as a 2×4 array of colour filters, using a dashed line box) is repeated throughout the CFA 502*b*, and wherein the given smallest repeating unit 504*b* comprises six green colour filters, one red colour filter, and one blue colour filter. The shown part of the CFA 502*b* has 8 rows R1, R2, R3, R4, R5, R6, R7, and R8, and has 8 columns C1, C2, C3, C4, C5, C6, C7, and C8, wherein each of the rows R1-R8 do not have colour filters of each of three different colours (for example, the rows R1, R3, R5, and R7 have only green colour filters, the rows R2 and R6 have only green colour filters and red colour filters, and the rows R4 and R8 have only green colour filters and blue colour filters), while the columns C2, C4, C6, and C8 have the colour filters of each of the three different colours (namely, green colour filters, red colour filters, and blue colour filters) and the columns C1, C3, C5, and C7 have only green colour filters. In this regard, when performing the subsampling, the image data can be read out from 32 photo-sensitive cells that correspond to even columns (namely, the columns C2, C4, C6, and C8) in the shown part of the CFA 502*b*, while the image data is not read out from remaining 32 photo-sensitive cells (crossed out as dotted 'X's) that correspond to odd columns (namely, the columns C1, C3, C5, and C7) in the shown part of the CFA 502*b*. It is to be noted that for the CFA 502*b*, since the columns C2, C4, C6, and C8 have the colour filters of each of the three different colours, the subsampling is performed in a column-wise manner. It will be appreciated that the CFA 502*b* having a higher number of green colour filters as compared to other colour filters could work in an actual implementation, as a green colour is a prominent colour for having accurate colour reproduction and improved resolution in an image.

With reference to FIG. 5C, the shown part of the CFA 502*c* comprises 36 colour filters arranged in a 6×6 array, wherein a given smallest repeating unit 504*c* (depicted as a 3×1 array of colour filters, using a dashed line box) is repeated throughout the CFA 502*c*, and wherein the given smallest repeating unit 504*c* comprises one green colour filter, one red colour filter, and one blue colour filter. The shown part of the CFA 502*c* has 6 rows R1, R2, R3, R4, R5, and R6, and has 6 columns C1, C2, C3, C4, C5, and C6, wherein each of the rows R1-R6 has colour filters of each of three different colours (namely, green colour filters, red colour filters, and blue colour filters), while each of the columns C1-C6 do not have the colour filters of each of the three different colours (for example, the columns C1 and C4 have only green colour filters, the columns C2 and C5 have only red colour filters, and the columns C3 and C6 have only blue colour filters). In this regard, when performing the subsampling, the image data can be read out from 18 photo-sensitive cells that correspond to even rows (namely, the rows R2, R4, and R6) in the shown part of the CFA 502*c*, while the image data is not read out from remaining 18 photo-sensitive cells (crossed out as dotted 'X's) that correspond to odd rows (namely, the rows R1, R3, and R5) in the shown part of the CFA 502*c*. It is to be noted that for the CFA 502*c*, since the rows R1-R6 have the colour filters of each of the three different colours, the subsampling is performed in a row-wise manner.

With reference to FIG. 5D, the shown part of the CFA 502*d* comprises 36 colour filters arranged in a 6×6 array, wherein a given smallest repeating unit 504*d* (depicted as a 3×3 array of colour filters, using a dashed line box) is repeated throughout the CFA 502*d*, and wherein the given smallest repeating unit 504*d* comprises three green colour filters, three red colour filters, and three blue colour filters. The shown part of the CFA 502*d* has 6 rows R1, R2, R3, R4, R5, and R6, and has 6 columns C1, C2, C3, C4, C5, and C6, wherein each of the rows R1-R6 and each of the columns C1-C6 have colour filters of each of three different colours (namely, green colour filters, red colour filters, and blue colour filters). It is to be noted that for the CFA 502*d*, since the rows R1-R6 as well as the columns C1-C6 have the colour filters of each of the three different colours, the subsampling can be performed in a row-wise manner and/or in a column-wise manner. As an example, when performing the subsampling for a 50 percent subsampling density, the image data is read out from 18 photo-sensitive cells that correspond to odd rows (namely, the rows R1, R3, and R5) in the shown part of the CFA 502*d*, while the image data is not read out from remaining 18 photo-sensitive cells (crossed out as dotted 'X's) that correspond to even rows (namely, the rows R2, R4, and R6) in the shown part of the CFA 502*d*.

With reference to FIG. 5E, the shown part of the CFA 502*e* comprises 64 colour filters arranged in an 8×8 array, wherein a given smallest repeating unit 504*e* (depicted as a 4×4 array of colour filters, using a dashed line box) is repeated throughout the CFA 502*e*, and wherein the given smallest repeating unit 504*e* comprises six green colour filters, five red colour filters, and five blue colour filters. The shown part of the CFA 502*e* has 8 rows R1, R2, R3, R4, R5, R6, R7, and R8, and has 8 columns C1, C2, C3, C4, C5, C6, C7, and C8, wherein each of the rows R1-R8 and each of the columns C1-C8 have colour filters of each of three different colours (namely, green colour filters, red colour filters, and blue colour filters). It is to be noted that for the CFA 502*e*, since the rows R1-R8 as well as the columns C1-C8 have the colour filters of each of the three different colours, the subsampling can be performed in a row-wise manner and/or in a column-wise manner. As an example, when performing the subsampling for a 25 percent subsampling density, the image data can be read out from 16 photo-sensitive cells that correspond to even rows (namely, the rows R2, R4, R6, and R8) and even columns (namely, the columns C2, C4, C6, and C8) in the shown part of the CFA 502*e*. The image data is not read out from remaining 48 photo-sensitive cells (crossed out as dotted 'X's) that correspond to odd rows (namely, the rows R1, R3, R5, and R7) and odd columns (namely, the columns C1, C3, C5, and C7) in the shown part of the CFA 502*e*.

Figure 6A:
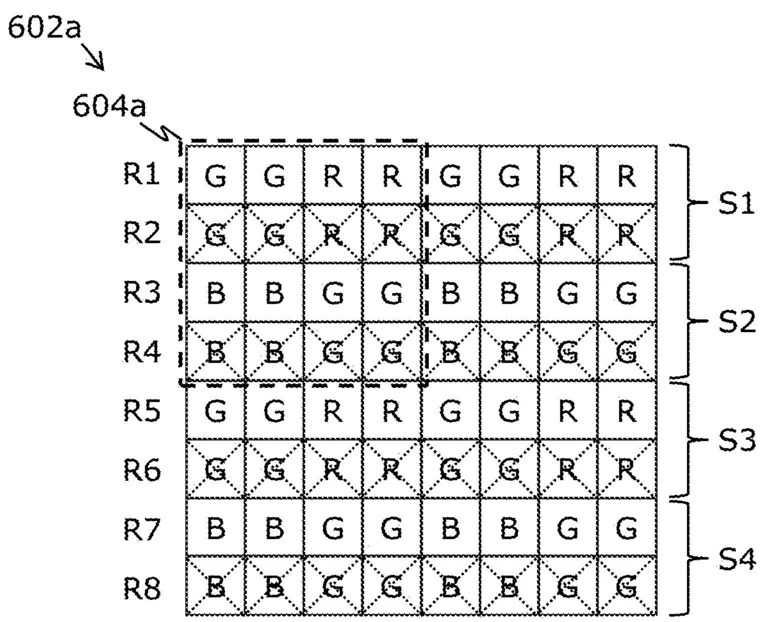
FIGS. 6A and 6B illustrate how subsampling is employed for different colour filter arrays when reading out image data from a region of a photo-sensitive surface of an image sensor, in accordance with different embodiments of the third aspect and the fourth aspect of the present disclosure.
Figure 6B:
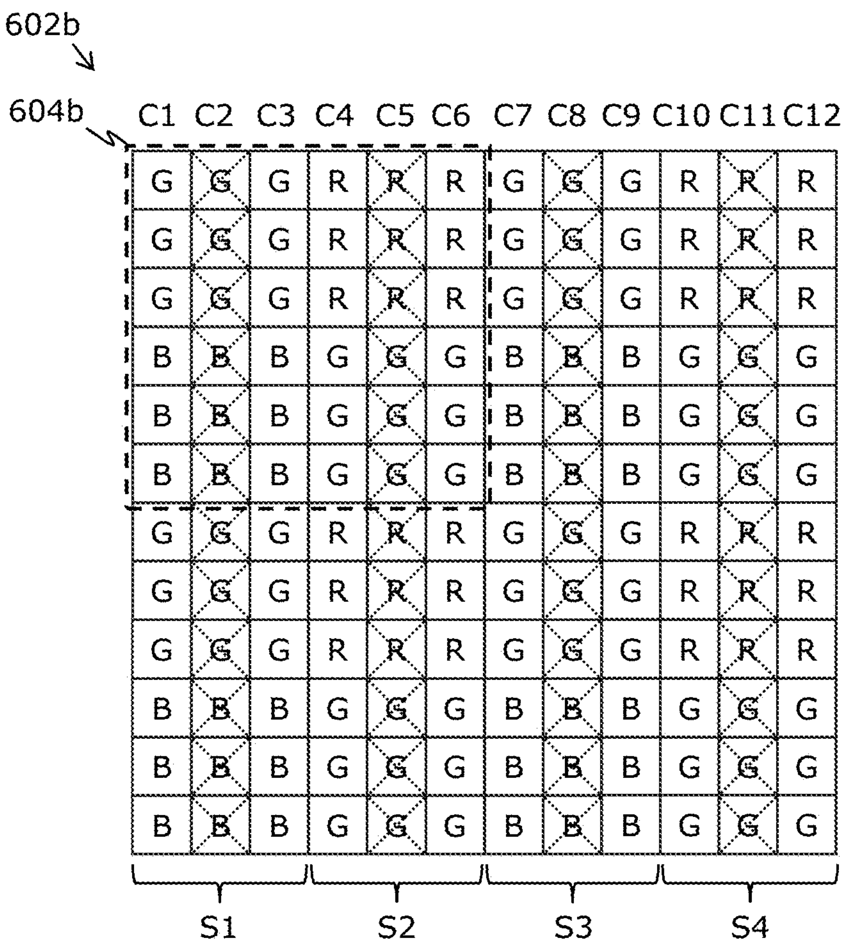

Referring to FIGS. 6A and 6B, illustrated is how subsampling is employed for different colour filter arrays (CFAs) 602*a* and 602*b* when reading out image data from a region of a photo-sensitive surface of an image sensor, in accordance with different embodiments of the third aspect and the fourth aspect of the present disclosure. With reference to FIGS. 6A and 6B, "B" refers to a blue colour filter, "G" refers to a green colour filter, and "R" refers to a red colour filter. It will be appreciated that in some implementations, a cyan colour filter, a magenta colour filter, and a yellow colour filter could also be employed instead of employing the blue colour filter, the green colour filter, and the red colour filter. It will also be appreciated that FIGS. 6A and 6B illustrate only few examples of CFAs, for sake of clarity and better understanding. Other different types of CFAs (for example, hexadeca-Bayer CFAs) could also be employed.

With reference to FIG. 6A, for sake of simplicity and clarity, only a part of the CFA 602*a* is shown, wherein said part corresponds to 64 photo-sensitive cells arranged in an 8×8 grid, and wherein colour filters in the shown part of the CFA 602*a* are arranged in front of respective ones of the 64 photo-sensitive cells. With reference to FIG. 6B, for sake of simplicity and clarity, only a part of the CFA 602*b* is shown, wherein said part corresponds to 144 photo-sensitive cells arranged in a 12×12 grid, and wherein colour filters in the shown part of the CFA 602*b* are arranged in front of respective ones of the 144 photo-sensitive cells. It will be appreciated that a photo-sensitive surface of a typical image sensor has millions of photo-sensitive cells (namely, pixels).

With reference to FIG. 6A, the shown part of the CFA 602*a* comprises 64 colour filters arranged in an 8×8 array, wherein a given smallest repeating unit 604*a* (depicted as a 4×4 array of colour filters, using a dashed line box) is repeated throughout the CFA 602*a*, and wherein the given smallest repeating unit 604*a* comprises eight green colour filters, four red colour filters, and four blue colour filters. In other words, the CFA 602*a* is a quad-Bayer CFA. The shown part of the CFA 602*a* has 8 rows R1, R2, R3, R4, R5, R6, R7, and R8 of colour filters, and has 4 sets S1, S2, S3, and S4 of repeating rows, wherein each of the sets S1-S4 comprises two rows that repeat consecutively. The set S1 comprises the rows R1 and R2, the set S2 comprises the rows R3 and R4, the set S3 comprises the rows R5 and R6, and the set S4 comprises the rows R7 and R8. In this regard, when performing the subsampling, the image data is read out from those photo-sensitive cells that correspond to one row out of the two rows in each of the sets S1-S4, and the image data is not read out from those photo-sensitive cells that correspond to a remaining row out of the two rows in each of the sets S1-S4. Thus, the image data can be read out from 32 photo-sensitive cells that correspond to the rows R1, R3, R5, and R7 in the shown part of the CFA 602*a*, while the image data is not read out from remaining 32 photo-sensitive cells (crossed out as dotted 'X's) that correspond to the rows R2, R4, R6, and R8 in the shown part of the CFA 602*a*.

It will be appreciated that when performing the subsampling, the image data may alternatively be read out from those photo-sensitive cells that correspond to any one column out of two columns in each set of repeating columns, wherein each set of the repeating columns comprises the two columns that repeat consecutively.

With reference to FIG. 6B, the shown part of the CFA 602*b* comprises 144 colour filters arranged in a 12×12 array, wherein a given smallest repeating unit 604*b* (depicted as a 6×6 array of colour filters, using a dashed line box) is repeated throughout the CFA 602*b*, and wherein the given smallest repeating unit 604*b* comprises eighteen green colour filters, nine red colour filters, and nine blue colour filters. In other words, the CFA 602*b* is a nona-Bayer CFA. The shown part of the CFA 602*b* has 12 columns C1, C2, C3, C4, C5, C6, C7, C8, C9, C10, C11, and C12 of colour filters, and has 4 sets S1, S2, S3, and S4 of repeating columns, wherein each of the sets S1-S4 comprises three columns that repeat consecutively. The set S1 comprises the columns C1, C2, and C3, the set S2 comprises the columns C4, C5, and C6, the set S3 comprises the columns C7, C8, and C9, and the set S4 comprises the columns C10, C11, and C12. In this regard, when performing the subsampling, the image data is read out from those photo-sensitive cells that correspond to any two columns out of the three columns in each of the sets S1-S4, and the image data is not read out from those photo-sensitive cells that correspond to a remaining column out of the three columns in each of the sets S1-S4. Thus, the image data can be read out from 96 photo-sensitive cells that correspond to the columns C1, C3, C4, C6, C7, C9, C10, and C12 in the shown part of the CFA 602*a*, while the image data is not read out from remaining 48 photo-sensitive cells (crossed out as dotted 'X's) that correspond to the columns C2, C5, C8, and C11 in the shown part of the CFA 602*a*.

It will be appreciated that when performing the subsampling, the image data may alternatively be read out from those photo-sensitive cells that correspond to any one column out of the three columns in each of the sets S1-S4, and the image data is not read out from those photo-sensitive cells that correspond to remaining two columns out of the three columns in each of the sets S1-S4.

FIG. 4, FIGS. 5A-5E, and FIGS. 6A-6B are merely examples, which should not unduly limit the scope of the claims herein. The person skilled in the art will recognize many variations, alternatives, and modifications of embodiments of the present disclosure.

The invention claimed is:

1. An imaging system comprising:

an image sensor comprising:

a plurality of photo-sensitive cells arranged on a photo-sensitive surface of the image sensor; and a colour filter array comprising colour filters of at least three different colours; and at least one processor configured to:

read out image data from the image sensor, wherein when reading out, the at least one processor is configured to employ subsampling in at least a region of the photo-sensitive surface, by:

reading out the image data from those photo-sensitive cells that correspond to a first set of lines in the colour filter array, wherein a given line in the first set comprises colour filters of each of the at least three different colours; and skipping read out from those photo-sensitive cells that correspond to a second set of lines in the colour filter array, wherein the first set of lines comprises one of: odd lines in the colour filter array, even lines in the colour filter array, while the second set of lines comprises another of: the odd lines, the even lines;

obtaining information indicative of a gaze direction of a user;

determining a gaze region and a peripheral region in the photo-sensitive surface of the image sensor, based on the gaze direction; and while reading out the image data from those photo-sensitive cells that correspond to a first set of lines in the colour filter array and skipping read out from those photo-sensitive cells that correspond to a second set of lines in the colour filter array, further employing the subsampling with a first subsampling density in the gaze region and with a second subsampling density in the peripheral region, the first subsampling density being higher than the second subsampling density;

the at least one processor further configured to process the image data to generate an image;

wherein the given line in the first set is a row of the colour filter array, and wherein another given line in the first set comprising colour filters of each of the at least three different colours is a column of the colour filter array.

2. The imaging system of claim 1, wherein the at least one processor is configured to select the first set of lines and the second set of lines as sets of at least one of: rows, columns, based on whether colour filters of each of the at least three different colours are arranged in rows, columns, or both rows and columns.

3. A method comprising:

reading out image data from an image sensor, wherein the image sensor comprises a plurality of photo-sensitive cells arranged on a photo-sensitive surface of the image sensor, and a colour filter array comprising colour filters of at least three different colours, and wherein the step of reading out comprises employing subsampling in at least a region of the photo-sensitive surface, by:

reading out the image data from those photo-sensitive cells that correspond to a first set of lines in the colour filter array, wherein a given line in the first set comprises colour filters of each of the at least three different colours; and skipping read out from those photo-sensitive cells that correspond to a second set of lines in the colour filter array, wherein the first set of lines comprises one of: odd lines in the colour filter array, even lines in the colour filter array, while the second set of lines comprises another of: the odd lines, the even lines;

obtaining information indicative of a gaze direction of a user;

determining a gaze region and a peripheral region in the photo-sensitive surface of the image sensor, based on the gaze direction; and while reading out the image data from those photo-sensitive cells that correspond to a first set of lines in the colour filter array and skipping read out from those photo-sensitive cells that correspond to a second set of lines in the colour filter array, further employing the subsampling with a first subsampling density in the gaze region and with a second subsampling density in the peripheral region, the first subsampling density being higher than the second subsampling density; and processing the image data to generate an image;

wherein the given line in the first set is a row of the colour filter array, and wherein another given line in the first set comprising colour filters of each of the at least three different colours is a column of the colour filter array.

4. The method of claim 3, further comprising selecting the first set of lines and the second set of lines as sets of at least one of: rows, columns, based on whether colour filters of each of the at least three different colours are arranged in rows, columns, or both rows and columns.

5. An imaging system comprising:

an image sensor comprising:

a plurality of photo-sensitive cells arranged on a photo-sensitive surface of the image sensor; and a colour filter array comprising sets of repeating rows or columns, wherein a given set of repeating rows or columns comprises N rows or columns that repeat consecutively; and at least one processor configured to:

read out image data from the image sensor, wherein when reading out, the at least one processor is configured to employ subsampling in at least a region of the photo-sensitive surface, by:

reading out the image data from those photo-sensitive cells that correspond to at most N-1 rows or columns out of the N rows or columns in each set of repeating rows or columns; and skipping read out from those photo-sensitive cells that correspond to a remainder of the N rows or columns in each set of repeating rows or columns;

obtaining information indicative of a gaze direction of a user;

determining a gaze region and a peripheral region in the photo-sensitive surface of the image sensor, based on the gaze direction; and while reading out the image data from those photo-sensitive cells that correspond to a first set of lines in the colour filter array and skipping read out from those photo-sensitive cells that correspond to a second set of lines in the colour filter array, employing the subsampling with a first subsampling density in the gaze region and with a second subsampling density in the peripheral region, the first subsampling density being higher than the second subsampling density;

the at least one processor further configured to process the image data to generate an image.

6. A method comprising:

reading out image data from an image sensor, wherein the image sensor comprises a plurality of photo-sensitive cells arranged on a photo-sensitive surface of the image sensor, and a colour filter array comprising sets of repeating rows or columns, wherein a given set of repeating rows or columns comprises N rows or columns that repeat consecutively, and wherein the step of reading out comprises employing subsampling in at least a region of the photo-sensitive surface, by:

reading out the image data from those photo-sensitive cells that correspond to at most N-1 rows or columns out of the N rows or columns in each set of repeating rows or columns; and skipping read out from those photo-sensitive cells that correspond to a remainder of the N rows or columns in each set of repeating rows or columns;

obtaining information indicative of a gaze direction of a user;

determining a gaze region and a peripheral region in the photo-sensitive surface of the image sensor, based on the gaze direction, and while reading out the image data from those photo-sensitive cells that correspond to a first set of lines in the colour filter array and skipping read out from those photo-sensitive cells that correspond to a second set of lines in the colour filter array, further employing the subsampling with a first subsampling density in the gaze region and with a second subsampling density in the peripheral region, the first subsampling density being higher than the second subsampling density; and processing the image data to generate an image.

* * * * *